United States Patent
Poeller et al.

(10) Patent No.: US 11,180,624 B2
(45) Date of Patent: Nov. 23, 2021

(54) ORGANIC CARBONATE AS BLOWING AGENT

(71) Applicant: Henkel AG & Co. KGaA, Duesseldorf (DE)

(72) Inventors: Sascha Poeller, Bochum (DE); Rainer Schoenfeld, Duesseldorf (DE); Thomas Bachon, Duesseldorf (DE); Klaus Rappmann, Weinheim-Rittenweier (DE); Rainer Kohlstrung, Plankstadt (DE); Constance Prost-Boucle, Lyons (FR)

(73) Assignee: Henkel AG & Co. KGaA

( * ) Notice: Subject to any disclaimer, the term of this patent is extended or adjusted under 35 U.S.C. 154(b) by 436 days.

(21) Appl. No.: 16/011,189

(22) Filed: Jun. 18, 2018

(65) Prior Publication Data

US 2018/0298156 A1 Oct. 18, 2018

Related U.S. Application Data

(63) Continuation of application No. PCT/EP2016/081948, filed on Dec. 20, 2016.

(30) Foreign Application Priority Data

Dec. 22, 2015 (DE) .......................... 102015226496.3

(51) Int. Cl.
| | |
|---|---|
| *C08J 9/08* | (2006.01) |
| *C08J 9/00* | (2006.01) |
| *C08K 5/00* | (2006.01) |
| *C08K 5/109* | (2006.01) |
| *B29C 44/18* | (2006.01) |
| *B29K 63/00* | (2006.01) |
| *B29K 105/00* | (2006.01) |
| *C08J 9/14* | (2006.01) |

(52) U.S. Cl.
CPC ............... *C08J 9/08* (2013.01); *C08J 9/0066* (2013.01); *C08K 5/0025* (2013.01); *C08K 5/109* (2013.01); *B29C 44/188* (2013.01); *B29K 2063/00* (2013.01); *B29K 2105/0014* (2013.01); *B29K 2105/253* (2013.01); *C08J 9/142* (2013.01); *C08J 2201/024* (2013.01); *C08J 2201/026* (2013.01); *C08J 2203/02* (2013.01); *C08J 2207/00* (2013.01); *C08J 2300/22* (2013.01); *C08J 2300/24* (2013.01); *C08J 2321/00* (2013.01); *C08J 2323/08* (2013.01); *C08J 2363/00* (2013.01)

(58) Field of Classification Search
CPC .. C08J 9/08; C08J 2201/024; C08J 2201/026; C08J 2203/02; C08J 2300/22; C08J 2300/24; C08J 2323/08; C08J 2207/00; C08K 5/109; C08K 5/0025; B29C 44/188; B29K 2105/0014; B29K 2063/00
See application file for complete search history.

(56) References Cited

U.S. PATENT DOCUMENTS

| | | | | |
|---|---|---|---|---|
| 2,628,945 | A | * | 2/1953 | Wayne ........................ C08J 9/08 521/90 |
| 3,224,983 | A | | 12/1965 | D'Alelio |
| 3,225,063 | A | * | 12/1965 | D Alelio .................... C08J 9/02 549/229 |
| 9,637,067 | B2 | | 5/2017 | Kohlstrung |

FOREIGN PATENT DOCUMENTS

| | | |
|---|---|---|
| DE | 102012221192 A1 | 5/2014 |
| JP | 403431 B | 2/1940 |
| JP | 4025272 B | 11/1940 |
| JP | 2013249454 A | 12/2013 |
| WO | 2007004184 A1 | 1/2007 |
| WO | 2007039309 A1 | 4/2007 |
| WO | 2008034755 A1 | 3/2008 |
| WO | 2013017536 A1 | 2/2013 |
| WO | 2015140282 A1 | 9/2015 |

OTHER PUBLICATIONS

Translation of JP 2013-249454 by Hanasaka et al. (Year: 2013).*
Pham, H.Q. and Marks, M.J. (2004). Epoxy Resins. In Encyclopedia of Polymer Science and Technology, (Ed.), doi:10.1002/0471440264.pst119 (Year: 2004).*
Singh, S.N. "Blowing Agents". Chapter in "Handbook of Polymer Foams". Ed. David Eaves. Shrewsbury, U.K: Rapra Technology Ltd, 2004. Internet resource. (Year: 2004).*
International Search Report for PCT/EP2016/081948, dated Feb. 10, 2017. English language version submitted herewith.

* cited by examiner

*Primary Examiner* — Michael M Dollinger
*Assistant Examiner* — Christina H. W. Rosebach
(74) *Attorney, Agent, or Firm* — Mary K. Cameron

(57) ABSTRACT

A thermally expandable composition that comprises at least one organic compound having at least one cyclic carbonate group as a blowing agent, at least one catalyst for the blowing agent, at least one reactive binder and at least one hardener and/or accelerator. Also provided are molded bodies containing the composition, and a method for sealing and filling hollow spaces in components, in order to strengthen or stiffen components, in particular hollow components, and for adhering movable components through use of molded bodies of this type, as well as to the use of corresponding cyclic organic carbonates as a blowing agent in thermally expandable compositions.

15 Claims, No Drawings

ORGANIC CARBONATE AS BLOWING AGENT

The present application relates to a thermally expandable composition comprising at least one organic compound that comprises at least one cyclic carbonate group as a blowing agent, at least one catalyst for the blowing agent, at least one reactive binder and at least one hardener and/or accelerator, to shaped bodies containing this composition, to a method for sealing and filling cavities in components, for strengthening or stiffening components, in particular hollow components, and for bonding movable components, using shaped bodies of this kind, and to the use of organic carbonates as blowing agents in thermally expandable compositions.

Modern vehicles and vehicle parts have a plurality of cavities which have to be sealed in order to prevent moisture and dirt from entering, since moisture and dirt can lead to the corresponding body parts corroding from within. This applies in particular to modern self-supporting body constructions in which a heavy frame construction is replaced by a lightweight, structurally rigid framework consisting of prefabricated cavity profiles. Constructions of this kind have a number of cavities, depending on the system, which have to be sealed against the ingress of moisture and dirt. Seals of this kind are also used to prevent the transmission of airborne sound in cavities of this kind, and to thus reduce levels of unpleasant noise generated by the vehicle moving and by the wind and thus increase travel comfort in the vehicle.

Baffle parts which have a sealing and/or acoustic effect in cavities of this kind are often referred to as "cavity sealing systems", "pillar fillers", "baffles" or "acoustic baffles". Generally, said parts consist either completely of thermally expandable shaped bodies or of shaped bodies which contain a carrier and polymer compositions that can expand in the periphery region thereof. Said baffle parts are fastened to the open structures in the shell by being hung, clipped, screwed or welded thereon. After the structures have been closed in the shell and after the vehicle body has undergone further preliminary treatments, the process heat of the furnace for curing the cathodic dip paint is then utilized so as to cause the expandable part of the baffle part to expand in order to thus seal the cross section of the cavity.

In modern vehicles, there is also an increasing need for metal lightweight components that are intended for dimensionally consistent batch production and have a specified rigidity and structural strength. In particular in vehicle construction, given the desire to reduce weight, there is a need for metal lightweight components consisting of thin-walled sheets which nevertheless have sufficient rigidity and structural strength. Here too, shaped bodies are used that consist of thermally expandable compositions which provide the required support properties.

Appropriate thermally expandable compositions are described, for example, in WO 2008/034755, WO 2007/039309, WO 2013/017536 and the German application DE 10 2012 221 192.6. These thermally expandable compositions are also used in the automotive sector.

Blowing agents, such as ADCA (azodicarbonamide), OBSH (4,4'-oxybis(benzenesulfonyl hydrazide)), DNPT (dinitrosopentamethylene tetramine), PTSS (p-toluene semicarbazide), BSH (benzene-4-sulfonohydrazide), TSH (toluene-4-sulfonohydrazide), 5-PT (5-phenyltetrazole) and the like are currently used in expandable compositions of this kind, such as rubber vulcanizates (sulfur, peroxide or benzoquinone dioxime) for sealing and bonding cavity sealing systems based on ethylene vinyl acetate, epoxide-based support foams and expandable sealing compounds in automotive construction.

These blowing agents are disadvantageous in that they may cause respiratory sensitization, are generally toxicologically dangerous, or are explosive. Furthermore, the decomposition thereof produces by-products, such as ammonia, formamide, formaldehyde or nitrosamines, which are banned in automotive construction according to the Global Automotive Declarable Substance List (GADSL), IFA-KMR-List 08/2012 or the BGIA report "Index of hazardous substances 2012". In addition, the VOC content (content of volatile organic compounds) is very high when using blowing agents. Therefore, these blowing agents have been classified as SVHCs under the REACH regulation and are extremely likely to be banned. As an alternative to these blowing agents, physical blowing agents may be used that usually consist of a gas encapsulated in a polymer shell, or highly volatile substances, such as pentane. However, the use of these blowing agents is disadvantageous in that a relatively high amount of blowing agent has to be used in order to achieve high expansion rates. Furthermore, the expandable compositions must not contain any components that influence the stability of the polymer shell, since otherwise the blowing agent vaporizes before being used as intended, which blowing agent is also often highly flammable.

The object of the present invention was therefore to provide thermally expandable compositions that are storage stable and contain blowing agents which are neither explosive nor toxicologically dangerous and which also have good expansion rates.

This object is surprisingly achieved by thermally expandable compositions comprising
 (1) at least one organic compound that comprises at least one cyclic carbonate group as a chemical blowing agent,
 (2) at least one catalyst for the blowing agent,
 (3) at least one reactive binder, and
 (4) at least one hardener and/or accelerator,
the reactive binder preferably being selected from the group of epoxides, rubbers and peroxidically crosslinkable polymers, in particular epoxides.

Corresponding compositions overcome the known drawbacks and, at the same time, have excellent expansion.

Therefore, in a first aspect, the present invention relates to a thermally expandable composition, containing
 (1) at least one organic compound that comprises at least one cyclic carbonate group as a chemical blowing agent,
 (2) at least one catalyst for the blowing agent,
 (3) at least one reactive binder, and
 (4) at least one hardener and/or accelerator,
the reactive binder preferably being selected from the group of epoxides, rubbers and peroxidically crosslinkable polymers.

In a further aspect, the invention relates to a shaped body which comprises a thermally expandable composition according to the invention.

Furthermore, the present invention is directed to a method for sealing and filling cavities in components, for strengthening or stiffening components, in particular hollow components, and for bonding movable components, using a thermally expandable composition or shaped body disclosed herein. In this case, the expandable composition is foamed by the at least one organic compound comprising at least one cyclic carbonate group, and the expandable composition is preferably expanded by more than 5 vol. %, preferably more than 50 vol. %, in particular more than 100 vol. %, based in each case on the expandable composition prior to expansion.

In yet another aspect, the present invention relates to the use of a shaped body described herein for acoustically sealing cavities in components and/or for sealing cavities in components from water and/or moisture, or for strengthening or stiffening components, in particular hollow components.

Finally, the present invention is directed to the use of at least one corresponding organic carbonate, in particular a carbonate of Formulas (I)-(VI), as disclosed herein, in a thermally expandable composition as a chemical blowing agent.

"At least one", as used herein, refers to one or more, for example 1, 2, 3, 4, 5, 6, 7, 8, 9 or more. In connection with components of the catalyst compositions described herein, this statement refers not to the absolute quantity of molecules, but, rather, to the type of component. "At least one organic carbonate" therefore signifies, for example, one or more organic carbonates, i.e. one or more different types of organic carbonates. Together with stated quantities, the stated quantities refer to the total quantity of the correspondingly designated type of component, as defined above.

"Integer", as used herein, denotes 0 and all natural numbers. "Natural number", as used herein, refers to the generally accepted meaning of the term and denotes 1, 2, 3, 4, 5, 6, 7, 8, 9, 10, and so forth.

As an essential component, the compositions contain at least one organic compound comprising at least one cyclic carbonate group as a chemical blowing agent, which are advantageous in that they are neither hazardous to health nor explosive and much lower amounts of or even no volatile organic compounds (VOC) are produced during expansion. The decomposition products are substantially $CO_2$ and the organic "residue molecule" to which the cyclic carbonate group was bound. The organic "residue molecule" can then be incorporated into the binder system such that no volatile organic compounds are released. Furthermore, the products produced thereby have a uniform foam structure over the entire process temperature range used for hardening.

"Chemical blowing agents" are understood to be compounds according to the invention that decompose upon the action of heat and thereby release gases. The at least one organic compound comprising at least one cyclic carbonate group is used, according to the invention, as a chemical blowing agent. In this case, said compound comprises at least one cyclic carbonate group which is bound to the organic compound. The cyclic carbonate group is necessarily bound to an organic compound. A compound that only consists of a cyclic carbonate group, such as ethylene carbonate, is not a compound according to the invention. When purely cyclic carbonates acting as blowing agents, such as ethylene carbonate, decomposed volatile organic compounds are left behind that cannot be incorporated in the foamed composition or that can only be poorly incorporated in said composition.

The organic compound used as a blowing agent preferably comprises at least two cyclic carbonate groups, in particular two to four cyclic carbonate groups. The organic compound used as a blowing agent is preferably a polyether and/or polyester, in particular a polyether, to which at least one, preferably at least two, cyclic carbonate groups are bound.

In a further preferred embodiment, the organic compound comprising at least one cyclic carbonate group and used as a blowing agent is a compound of Formula (I)

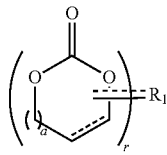

wherein ~~~~~ is a single or double bond, preferably a single bond, and when the ring contains a double bond, $R_1$ is not bound by an exocyclic double bond, but rather by a single bond, and vice versa; $R_1$ is a linear or branched, substituted or unsubstituted alkyl; a linear or branched, substituted or unsubstituted heteroalkyl; a linear or branched, substituted or unsubstituted alkenyl; a linear or branched, substituted or unsubstituted alkynyl; a substituted or unsubstituted cycloalkyl; a substituted or unsubstituted aryl; or —C(O)—$R^a$, where $R^aH$ is a linear or branched, substituted or unsubstituted alkyl; a linear or branched, substituted or unsubstituted heteroalkyl; a linear or branched, substituted or unsubstituted alkenyl; a linear or branched, substituted or unsubstituted alkynyl; a substituted or unsubstituted cycloalkyl; a substituted or unsubstituted aryl; preferably a linear or branched, substituted or unsubstituted heteroalkyl; and $R^a$ preferably comprising at least two, preferably at least four, carbon atoms. In Formula (I), "a" is an integer from 0 to 5, preferably 0 or 1 and particularly preferably 0. Furthermore, "r" is a natural number from 1 to 10, preferably from 1 to 4 and particularly preferably from 2 to 4.

"Substituted", as used herein with reference to alkyl or heteroalkyl functional groups, means that the corresponding group is substituted with one or more substituents selected from the group consisting of —OR', —COOR', —NR'R", —C(=X)NR'R", —NR"C(=X)NR'R", halogen, unsubstituted 06-14 aryl, unsubstituted 02-14 heteroaryl containing from 1 to 5 heteroatoms selected from O, N and S, unsubstituted $C_{3-10}$ cycloalkyl and unsubstituted $C_{2-10}$ heteroalicyclyl containing from 1 to 5 heteroatoms selected from O, N and S.

"Substituted", as used herein with reference to aryl and cycloalkyl functional groups, means that the corresponding group can be substituted with one or more substituents selected from the group consisting of —OR', —COOR', —NR'R", —C(=X)NR'R", —NR"C(=X)NR'R", halogen, unsubstituted $C_{1-10}$ alkyl and —$CH_2$ aryl, it being possible for the aryl group in the —$CH_2$ aryl group to in turn be substituted with —OR', —COOR', —NR'R", —C(=X)NR'R", —NR"C(=X)NR'R", halogen and unsubstituted $C_{1-10}$ alkyl.

R' and R" are in this case selected, independently of one another, from H, unsubstituted $C_{1-10}$ alkyl, unsubstituted $C_{6-14}$ aryl, unsubstituted $C_{2-14}$ heteroaryl, unsubstituted $C_{3-10}$ cycloalkyl, unsubstituted $C_{2-10}$ heteroalicyclyl, alkylaryl, arylalkyl, heteroarylalkyl and alkylheteroaryl.

"Alkyl", as used herein, refers to linear or branched alkyl groups preferably having 1 to 30 carbon atoms, such as methyl, ethyl, n-propyl, iso-propyl, n-butyl, n-pentyl, n-hexyl, n-heptyl, n-octyl, n-nonyl, n-decyl, n-undecyl and n-dodecyl, and the linear $C_{14}$, $C_{16}$ and $C_{18}$ alkyl functional groups. In various embodiments, the alkyl functional groups are short-chain $C_{1-4}$ alkyl functional groups, in particular unsubstituted, linear $C_{1-4}$ alkyl functional groups. The alkyl functional groups can be substituted or unsubstituted, but are preferably unsubstituted. If they are substituted, the substituents are in particular selected from the above-described groups of substituents.

"Heteroalkyl", as used herein, refers to alkyl functional groups as defined above in which at least one carbon atom is replaced by a heteroatom, in particular N or O, particularly preferably O.

"Aryl", as used herein, refers to aromatic groups that have 5 to 30 carbon atoms and can have at least one aromatic ring, but also a plurality of condensed rings, such as phenyl, naphthyl, anthracenyl and the like. The aryl functional groups can be substituted or unsubstituted. If they are substituted, the substituents are selected from the above-described groups of substituents.

"Heteroaryl", as used herein, refers to aryl functional groups as defined above in which at least one carbon atom is replaced by a heteroatom, in particular N, S or O, particularly preferably O.

"Halogen", as used herein, refers to F, Cl, Br and I.

"Cycloalkyl", as used herein, refers to non-aromatic, cyclic hydrocarbons, in particular cyclic alkyl or alkenyl functional groups as defined above, e.g. cyclopentyl, cyclohexyl and cyclohexenyl functional groups. If they are substituted, the substituents are selected from the above-described groups of substituents.

"Heteroalicyclyl", as used herein, refers to cycloalkyl functional groups as defined above in which at least one carbon atom is replaced by a heteroatom, in particular N, S or O, particularly preferably O.

In another preferred embodiment, the organic compound comprising at least one cyclic carbonate group and used as a blowing agent is a compound of Formula (II)

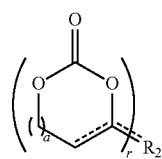

(II)

In Formula (II), ~~~~~~, "a" and "r" are as defined above in Formula I. Furthermore, $R_2$ is defined in the same way as $R_1$ in Formula I. Here too, when the ring contains a double bond, $R_2$ is not bound by an exocyclic double bond, but rather by a single bond, and vice versa. $R_2$ is also defined in the same way as $R_1$ and is preferably a linear or branched, substituted or unsubstituted heteroalkyl.

Particularly preferred are those compounds in which $R_1$ and $R_2$ are each a divalent or polyvalent heteroalkyl group, such as a pentaerythritol functional group, to which two or more of the cyclic carbonate groups are then bound. In particular, $R_1$ and $R_2$ represent polyesters and polyethers, preferably polyethers, to which two or more of the cyclic carbonate groups are then bound.

In order to prepare alkenyl ether polyols, cyclic carbonates are often used that correspond to derivatives of the carbonates of Formulas (I) and (II). Examples of derivatives thereof include those which are substituted, at the ring methylene groups, in particular at those which do not bear the $R_1$ or $R_2$ functional group, with organic functional groups, for example, in particular linear or branched, substituted or unsubstituted alkyl or alkenyl functional groups having up to 20 carbon atoms, in particular =$CH_2$ and —CH=$CH_2$, or linear or branched, substituted or unsubstituted heteroalkyl or heteroalkenyl functional groups having up to 20 carbon atoms, and at least one oxygen or nitrogen atom, or functional groups such as —OH or —COOH. Examples of derivatives of this kind include, for example, 4-methylene-1,3-dioxolane-2-one, which bears the $R_1$ or $R_2$ functional group at the 5-position, or di-(trimethylolpropane)dicarbonate, the $R_1$ or $R_2$ functional group in the 5-position being a methylene trimethylol monocarbonate functional group.

In various embodiments in which the $R_1$ or $R_2$ functional group is bound by a single bond, the ring carbon atom which bears the $R_1$ or $R_2$ functional group can be substituted with a further substituent, defined in the same way as the above-mentioned substituents for the other ring methylene groups.

Further derivatives are those in which one or both of the ring oxygen atoms are replaced by sulfur atoms, and those in which, alternatively or in addition, the carbonyl oxygen atom is replaced by a sulfur atom.

The organic compounds comprising at least one cyclic carbonate group and used as a blowing agent are prepared by reacting an epoxide of oxetane with carbon dioxide, the compounds of Formula (II) in particular being prepared in this way. A compound having a five-membered cyclic carbonate is obtained when an epoxide is reacted, whereas a compound having a six-membered cyclic carbonate is obtained when an oxetane is reacted. The organic compounds comprising at least one cyclic carbonate group and used as a blowing agent are particularly preferably prepared by reacting an epoxide, in particular a polyepoxide, with carbon dioxide. Epoxides based on a polyvalent aliphatic polyether, such as an ether of pentaerythritol, or aromatic epoxides, in particular epoxides based on bisphenol derivatives, are particularly preferred. When a polyepoxide (compound having at least two, in particular exactly two, epoxide groups per molecule) is reacted with carbon dioxide, the reaction does not necessarily have to be complete; 70 to 100% of the epoxide groups are preferably reacted. However, a complete reaction is preferred.

In yet another preferred embodiment of the present invention, the organic compound comprising at least one cyclic carbonate group and used as a blowing agent is a compound of Formula (III) or (IV).

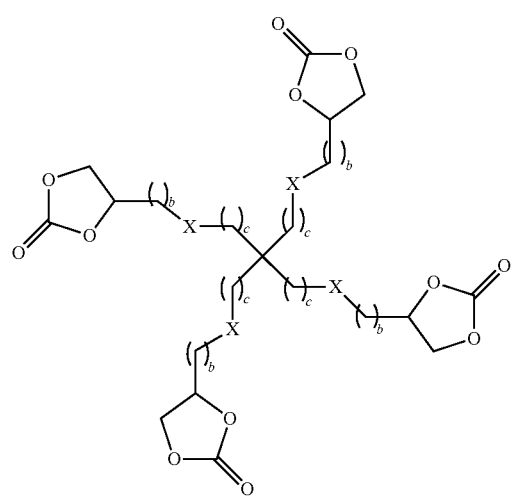

(III)

-continued

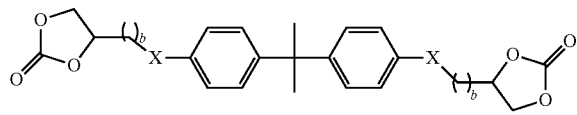
(IV)

Here, each "b" and each "c" are, independently of one another, a natural number from 1 to 5, preferably 1 or 2 and particularly preferably 1. Each "b", just like each "c", can be different or the same. Each "b" and each "c" are preferably the same. Furthermore, each X is selected independently from the group consisting of O, S and N. Each X is preferably O.

In yet another preferred embodiment, the organic compound comprising at least one cyclic carbonate group and used as a blowing agent is a compound of Formula (V) or (VI)

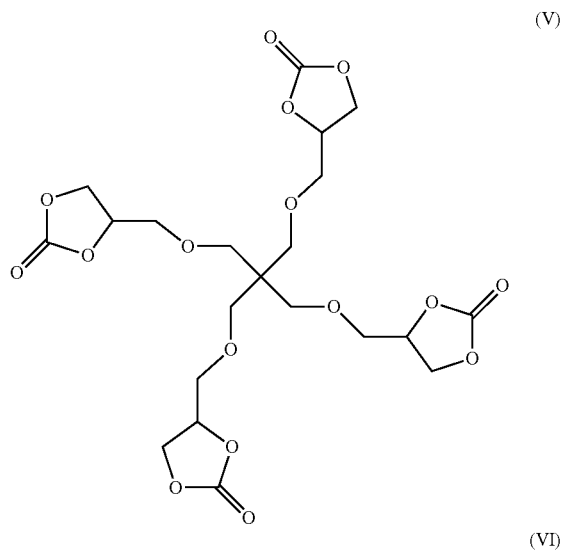
(V)

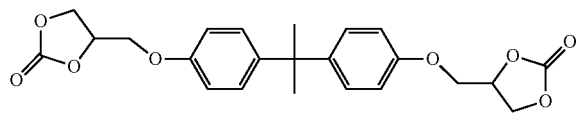
(VI)

The organic carbonates according to the invention are synthetically obtainable under gentle conditions by a corresponding epoxide and $CO_2$ as starting materials in the presence of a catalyst.

The thermally expandable compositions contain the organic compounds comprising at least one cyclic carbonate group and used as a blowing agent in an amount of from 0.1 to 40 wt. %, preferably from 1 to 35 wt. %, particularly preferably from 5 to 35 wt. %, even more preferably from 10 to 30 wt. %, and most preferably from 15 to 25 wt. %. Unless indicated otherwise, the amounts in wt. % given here are based on the total weight of the total composition prior to expansion.

In another preferred embodiment, the thermally expandable compositions contain the organic compounds comprising at least one cyclic carbonate group and used as a blowing agent in an amount of from 0.1 to 40 wt. %, preferably from 1 to 35 wt. %, particularly preferably from 5 to 35 wt. %, even more preferably from 10 to 30 wt. %, and most preferably from 15 to 25 wt. %, based in each case on the binder system (total weight of the total composition prior to expansion, without fillers).

Optionally, further chemical and/or physical blowing agents can be added to the composition according to the invention.

In a particularly preferred embodiment, the blowing agent is introduced into the thermally expandable composition as a "masterbatch". "Masterbatch" is understood to mean a premixture of the blowing agent to be used, e.g. with a polymer, preferably the at least one polymer. In addition to being advantageous in terms of procedure, this technique is also advantageous in that the blowing agent can be distributed in a particularly homogeneous and sparing manner, and the amount of heat produced by the kneading/mixing is thereby reduced. The blowing agent can therefore be prevented from inadvertently decomposing.

The expandable compositions are preferably free of ADCA (azodicarbonamide) and OBSH (4,4'-oxybis(benzenesulfonyl hydrazide), in particular free of ADCA (azodicarbonamide), OBSH (4,4'-oxybis(benzenesulfonyl hydrazide), DNPT (dinitrosopentamethylene tetramine), PTSS (p-toluene semicarbazide), BSH (benzene-4-sulfonohydrazide), TSH (toluene-4-sulfonohydrazide) and 5-PT (5-phenyltetrazole), particularly preferably free of other exothermic blowing agents, in particular free of other blowing agents. The expandable compositions are preferably free of inorganic carbonates. "Free of", as used in this connection, means that the amount of the corresponding substance in the reaction mixture is less than 0.05 wt. %, preferably less than 0.01 wt. %, even more preferably less than 0.001 wt. %, based on the total weight of the reaction mixture, in particular that the mixture is completely free of said substance.

In general, the thermally expandable compositions described herein contain, in addition to the above-described blowing agents, at least one reactive binder and at least one hardener and/or accelerator.

In general, the hardener and/or accelerator is preferably present in a total amount of at least 0.25 wt. %, and in particular at least 1.5 wt. %, based on the total composition. However, a total of more than 5 wt. %, based on the total weight of the composition, is generally not required. However, the proportion of the hardener and/or accelerator can vary widely, depending on the system used.

The proportion of the reactive binder in the total composition can generally be within the range of from 2 to 65 wt. %. However, the proportion of the binder can vary widely, depending on the system used. Preferred reactive binders of the thermally expandable compositions are selected from the group of epoxides, rubbers and peroxidically crosslinkable polymers.

In a preferred embodiment, such as for low-temperature expandable formulations, the reactive binders have a melting point (determinable by means of DSC in accordance with ASTM D3417) that is below the decomposition temperature of the blowing agent. In an advantageous embodiment, e.g. for low-temperature expandable formulations, the blowing agents have a decomposition temperature of below 175° C., preferably between 175 and 120° C., and the at least one reactive binder has a melting point of below 100° C., preferably between 75 and 55° C., and/or a melt flow index MFI of greater than 6 g/10 min, preferably between 10 and 6 g/10 min. In another advantageous embodiment, e.g. for high-temperature expandable formulations, the blowing agents have a decomposition temperature of above 175° C., preferably between 175 and 240° C., and the at least one reactive binder has a melting point of below 125° C., preferably between 100 and 80° C., and/or a melt flow index MFI of less than 6 g/10 min, preferably between 1.5 and 6 g/10 min. In each of these two embodiments, it is preferable for the reactive binder to have both the stated melting temperature and the stated MFI.

A preferred subject contains epoxides as a reactive binder. A plurality of polyepoxides having at least two 1,2 epoxy groups per molecule are suitable as epoxide resins. The epoxide equivalent of these polyepoxides can vary between 150 and 50,000, preferably between 170 and 5,000. In principle, the polyepoxides may be saturated, unsaturated, cyclic or acyclic, aliphatic, alicyclic, aromatic or heterocyclic polyepoxide compounds. Examples of suitable polyepoxides include polyglycidyl ethers prepared by reacting epichlorohydrin or epibromohydrin with a polyphenol in the presence of an alkali. Polyphenols suitable for this are, for example, resorcinol, pyrocatechol, hydroquinone, bisphenol A (bis-(4-hydroxy-phenyl)-2,2-propane)), bisphenol F (bis (4-hydroxyphenyl)methane), bis(4-hydroxyphenyl)-1,1-isobutane, 4,4'-dihydroxybenzophenone, bis(4-hydroxyphenyl)-1,1-ethane and 1,5-hydroxynaphthaline. Other polyphenols that are suitable as the basis for polyglycidyl ethers are the known condensation products of phenol and formaldehyde or acetaldehyde of the novolac resin type.

Other polyepoxides that are in principle suitable are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Other polyepoxides are polyglycidyl esters of polycarboxylic acids, for example reaction products of glycidol or epichlorohydrin with aliphatic or aromatic polycarboxylic acids such as oxalic acid, succinic acid, glutaric acid, terephthalic acid or dimer fatty acid.

Other epoxides are derived from the epoxidation products of olefinically unsaturated cycloaliphatic compounds or from native oils and fats.

Depending on the desired use, it may be preferable for the composition to additionally contain a resin that has a flexibilizing effect. This may also be an epoxy resin. The per se known adducts of carboxyl-terminated butadiene acrylonitrile copolymers (CTBN) and liquid epoxide resins based on the diglycidyl ether of bisphenol A can be used as resins that have a flexibilizing effect. Specific examples are the reaction products of Hycar CTBN 1300 X8, 1300 X13 or 1300 X15 from B. F. Goodrich with liquid epoxide resins. Furthermore, the reaction products of amino-terminated polyalkylene glycols (Jeffamine) with an excess of liquid polyepoxides can also be used. In principle, reaction products of mercapto-functional prepolymers or liquid thiol polymers with an excess of polyepoxides can also be used according to the invention as epoxide resins that have a flexibilizing effect. However, more particularly preferred are the reaction products of polymeric fatty acids, in particular dimer fatty acid, with epichlorohydrin, glycidol or in particular diglycidyl ether of bisphenol A (DGBA).

The thermally expandable preparations preferably contain at least 5 wt. % of at least one epoxide. Particularly preferred are thermally expandable preparations that contain from 5 to 70 wt. %, in particular from 20 to 50 wt. %, of at least one epoxide, based in each case on the total weight of the thermally expandable preparation.

Guanidines, substituted guanidines, substituted ureas, melamine resins, guanamine derivatives, cyclic tertiary amines, aromatic amines and/or mixtures thereof can be used as thermally activatable or latent hardeners for the epoxide resin binder system consisting of the aforementioned components. In this case, the hardeners can be stoichiometrically involved in the hardening reaction. However, they may also have a catalytic effect. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and very particularly cyanoguanidine (dicyandiamide). Representatives of suitable guanamine derivatives which may be mentioned are alkylated benzoguanamine resins, benzoguanamine resins or methoxymethyl-ethoxymethylbenzoguanamine. For monocomponent, thermo-hardening shaped bodies, the selection criterion is the low solubility of these substances at room temperature in the resin system, such that solid, finely ground hardeners are preferred here. Dicyandiamide is particularly suitable. Good storage stability of the thermo-hardening shaped bodies is thereby ensured.

In addition to or instead of the aforementioned hardeners, substituted ureas that have a catalytic effect can also be used. These are in particular p-chlorophenyl-N,N-dimethylurea (monuron), 3-phenyl-1,1-dimethylurea (fenuron) or 3,4-dichlorophenyl-N,N-dimethylurea (diuron). In principle, tertiary acryl or alkyl amines that have a catalytic effect can also be used, for example benzyldimethylamine, tris(dimethylamino)phenol, piperidine or piperidine derivatives. However, these are often too soluble in the adhesive system, such that the monocomponent system is not storage stable as is required. Furthermore, various preferably solid imidazole derivatives can be used as accelerators that have a catalytic effect. Representatives which may be mentioned are 2-ethyl-2-methyl imidazole, N-butyl imidazole, benzimidazole and N—$C_{1-12}$ alkyl imidazoles or N-aryl imidazoles. Particularly preferred is the use of a combination of a hardener and an accelerator in the form of "accelerated" dicyandiamides in a finely ground form. This means that it is superfluous to separately add accelerators that have a catalytic effect to the epoxide hardening system.

In order to improve shock resistance, one or more "impact modifiers" may also be present, which are known in the prior art for this purpose. Examples are thermoplastic resins that preferably bear groups that are reactive to epoxy groups. Natural or synthetic rubbers are also suitable for this purpose. Specific examples of these can be found in paragraphs [27] and [28] (pages 6 and 7) of WO 2007/004184.

A further preferred subject contains at least one reactive binder based on natural and/or synthetic rubbers. In addition to the reactive binders based on natural and/or synthetic rubbers (i.e. elastomers containing an olefinic double bond), the composition preferably contains at least one vulcanizing agent. In a preferred embodiment of thermally expandable compositions based on natural and/or synthetic rubbers, the composition contains:

0 to 10 wt. %, preferably 1 to 10 wt. %, of solid rubber(s) having a molecular weight of 100,000 or more
   5 to 50 wt. % of liquid polyene(s) having a molecular weight of less than 20,000, and
   a vulcanizing system consisting of sulfur and one or more organic accelerators and/or metal oxides.

In this case, liquid rubbers or elastomers can be selected from the following group of homopolymers and/or copolymers: polybutadienes, in particular 1,4-polybutadiene and 1,2-polybutadiene; polybutenes, polyisobutylenes, 1,4-polyisoprene and 3,4-polyisoprene, styrene-butadiene copolymers, butadiene-acrylonitrile copolymers, it being possible for these polymers to have terminal and/or (statistically distributed) pendant functional groups. Examples of functional groups of this kind are hydroxy, amino, carboxyl, carboxylic acid anhydride or epoxy groups. The weight-average molecular weight Mw of these liquid rubbers is typically below 20,000 g/mol, preferably between 900 and 10,000 (measured by means of GPC by comparison with a polystyrene standard).

In this case, the proportion of liquid rubber in the total composition is dependent on the desired rheology of the unhardened composition and the desired mechanical properties of the hardened composition. The proportion of liquid rubber or elastomer normally varies between 5 and 50 wt. % of the total formulation. It has been found to be expedient to preferably use mixtures of liquid rubbers having a different molecular weight and different configuration in relation to the remaining double bonds. In order to achieve optimum adhesion to the various substrates, a proportion of a liquid rubber component having hydroxyl groups and/or acid anhydride groups is used in the particularly preferred formulations. At least one of the liquid rubbers should have a high proportion of cis-1,4 double bonds, and another liquid rubber should have a high proportion of vinyl double bonds.

By comparison with the liquid rubbers, suitable solid rubbers have a significantly higher molecular weight (Mw=100,000 or more). Examples of suitable rubbers are polybutadiene, preferably having a very high proportion of cis-1,4 double bonds (typically above 95%), styrene butadiene rubber, butadiene acrylonitrile rubber, synthetic or natural isoprene rubber, butyl rubber or polyurethane rubber.

For the compositions based on natural and/or synthetic rubbers, a plurality of vulcanizing systems based on elemental sulfur and vulcanizing systems not containing elemental sulfur are suitable, vulcanizing systems based on thiuram disulfides and peroxides belonging to the group of systems not containing elemental sulfur. Vulcanizing systems based on elemental sulfur, organic vulcanization accelerators and zinc compounds are particularly preferred. In this case, the powdered sulfur is used in amounts of from 0.1 to 15 wt. %, based on the total composition, and particularly preferably amounts of between 0.2 and 8 wt. %, more particularly preferably between 1 and 4 wt. %, are used. Dithiocarbamates (in the form of ammonium or metal salts thereof), xanthogenates, thiuram compounds (monosulfides and disulfides), thiazole compounds, aldehyde/amine accelerators (e.g. hexamethylenetetramine) and guanidine accelerators are suitable as organic accelerators, dibenzothiazyl disulfide (MBTS) being more particularly preferably used. A combined vulcanizing system consisting of elemental sulfur, the above-mentioned accelerators and a quinone oxime, such as p-benzoquinone dioxime, or a nitrosobenzene compound, such as p-dinitrosobenzene, is preferably used. The organic accelerators are used in amounts of between 0.5 and 8 wt. %, based on the total formulation, preferably between 1 and 3 wt. %. The zinc compounds acting as accelerators can be selected from the zinc salts of fatty acids, zinc dithiocarbamates, basic zinc carbonates and in particular fine-particle zinc oxide. The content of zinc compounds is in the range of between 0.5 and 10 wt. %, preferably between 1 and 5 wt. %. In addition, other typical rubber vulcanizing auxiliary agents, such as fatty acids (e.g. stearic acid), may also be present in the formulation.

The vulcanizing system may however also be free of elemental sulfur. For example, peroxides, preferably organic peroxides, can be used as the vulcanizing system. Examples are: examples and preferred peroxides are those mentioned below. The amounts for use of the peroxides are preferably: from 0.3 to 4.5 wt. %, based on the total composition.

Although these compositions generally already have very good adhesion to substrates owing to the content of liquid rubber having functional groups, tackifiers and/or adhesion promoters can be added if necessary. Hydrocarbon resins, phenol resins, terpene phenol resins, resorcinol resins or derivatives thereof, modified or unmodified resin acids or esters (abietic acid derivatives), polyamines, polyaminoamides, anhydrides and anhydride-containing copolymers, for example, are suitable for this purpose. Adding polyepoxide resins in low amounts (<1 wt. %) can also improve adhesion in the case of some substrates. For this purpose, however, the solid epoxide resins having a molecular weight of significantly higher than 700 are preferably used in a finely ground form, such that the formulations are nevertheless substantially free of epoxy resins, in particular those having a molecular weight of below 700. If tackifiers and/or adhesion promoters are used, the type and amount thereof is dependent on the polymer composition of the adhesive/sealant, on the desired strength of the hardened composition, and on the substrate to which the composition is applied. Typical tackifying resins (tackifiers), such as terpene phenolic resins or resin acid derivatives, are normally used in concentrations of between 5 and 20 wt. %, and typical adhesion promoters, such as polyamines, polyaminoamides or resorcinol derivatives are used in the range of between 0.1 and 10 wt. %.

In a further preferred embodiment of thermally expandable compositions based on natural and/or synthetic rubbers, the compositions contain:
- 15 to 70 wt. %, preferably 20 to 40 wt. %, of at least one thermoplastic elastomer, preferably a styrene/butadiene or styrene/isoprene block copolymer;
- 5 to 40 wt. %, preferably 10 to 20 wt. %, of at least one non-elastomeric thermoplastic polymer (preferably an ethylene/vinyl acetate or ethylene/methyl acrylate copolymer); and
- 0.1 to 4 wt. % of one or more vulcanizing agents, the above-mentioned agents being preferred, in particular sulfur.

Furthermore, the compositions can preferably contain the following components in isolation or in combination:
- 0.01 to 2 wt. %, preferably 0.05 to 1 wt. %, of at least one stabilizer or antioxidant;
- 0.1 to 15 wt. %, preferably 2 to 10 wt. %, of at least one tackifying resin;
- 0.1 to 15 wt. %, preferably 2 to 10 wt. %, of at least one plasticizer;
- 0.5 to 8 wt. %, preferably 1 to 3 wt. %, of at least one organic accelerator, in particular one of those mentioned above;
- 0.5 to 10 wt. %, preferably 1 to 5 wt. %, of at least one zinc compound acting as an accelerator, in particular fine-particle zinc oxide.

The percentages in this case are expressed as percentages by weight based on the total weight of the thermally expandable material.

A thermoplastic elastomer is preferably used of which the softening point is no higher than the temperature at which the blowing agent begins to be activated; the softening point is preferably at least approximately 30° C. lower than the activation temperature of the blowing agent. The softening point is determined by means of DSC.

The thermoplastic elastomer is preferably selected from the group consisting of thermoplastic polyurethanes (TPU) and block copolymers (including both linear and radial block copolymers) of the A-B, A-B-A, A-(B-A)n-B and (A-B)n-Y types, A being an aromatic polyvinyl ("hard") block and the B block being a rubber-like ("soft") block of polybutadiene, polyisoprene or the like, which may be partially hydrogenated or is completely hydrogenated, Y being a polyfunctional compound, and n being an integer of at least 3. The hydrogenation of the B-block removes double bonds that were initially present and increases the thermal stability of the block copolymer. However, there is preferably no hydrogenation.

Suitable block copolymers include, but are not limited to, SBS (styrene/butadiene/styrene) copolymers, SIS (styrene/isoprene/styrene) copolymers, SEPS (styrene/ethylene/propylene/styrene) copolymers, SEEPS (styrene/ethylene/ethylene/propylene/styrene) or SEBS (styrene/ethylene/butadiene/styrene) copolymers. Particularly suitable block copolymers are styrene/isoprene/styrene triblock polymers, and completely or partially hydrogenated derivatives thereof, the polyisoprene block preferably containing a relatively high number of monomer units, derived from isoprene, in a 1,2 and/or 3,4 configuration.

Preferably, at least approximately 50% of the polymerized isoprene monomer units are contained in the polymer in a 1,2 and/or 3,4 configuration, the rest of the isoprene units having a 1-4 configuration. Block copolymers of this kind are available, for example, from Kuraray Co., Ltd. under the trade name HYBRAR.

In certain preferred embodiments of the invention, the "hard" blocks have a proportion by weight of approximately 15 to approximately 30 wt. % of the block copolymer, and the "soft" blocks have a proportion by weight of approximately 70 to approximately 85 wt. % of the block copolymer.

The glass transition temperature of the "soft" blocks is preferably approximately −80° C. to approximately 10° C., whereas the glass transition temperature of the "hard" blocks is preferably approximately 90° C. to approximately 110° C. The melt flow index of the block copolymer is preferably approximately 0.5 to approximately 6 g/10 min (measured in accordance with ASTM D1238, 190° C., 2.16 kg). The block copolymer preferably has a number-average molecular weight of approximately 30,000 to approximately 300,000, measured by means of GPC by comparison with a polystyrene standard.

Thermoplastic polyurethanes (TPU) can also be used as thermoplastic elastomers, and so too can other block copolymers containing hard and soft segments, such as polystyrene/polydimethylsiloxane block copolymers, polysulfone/polydimethylsiloxane block copolymers, polyester/polyether block copolymers (e.g. copolyesters such as those consisting of dimethyl terephthalate, poly(tetramethylene oxide)glycol and tetramethylene glycol), polycarbonate/polydimethylsiloxane block copolymers and polycarbonate/polyether block copolymers.

Thermoplastic elastomers that are not block copolymers are generally finely interdispersed multiphase systems or alloys and can also be used, including mixtures of polypropylene with ethylene propylene rubber (EPR) or ethylene propylene diene monomer rubber (EPDM).

In this embodiment involving one or more thermoplastic elastomers, the expandable material preferably contains one or more non-elastomeric thermoplastic polymers. In this case, the non-elastomeric thermoplastic polymer is selected, inter alia, in order to improve the adhesion properties and workability of the expandable composition.

Generally, it is desirable for a non-elastomeric thermoplastic polymer to be used of which the softening point is no higher than the temperature at which the blowing agent begins to be activated, which softening point is preferably at least approximately 30° C. lower than said activation temperature.

The particularly preferred non-elastomeric thermoplastic polymers include olefin polymers, in particular copolymers of olefins (e.g. ethylene) having non-olefinic monomers (e.g. vinyl esters, such as vinyl acetate and vinyl propionate, (meth)acrylate esters, such as C1 to C6 alkyl esters of acrylic acid and methacrylic acid), ethylene/vinyl acetate copolymers (specifically copolymers having a proportion of approximately 16 to 35 wt. % of vinyl acetate) and ethylene/methyl acrylate copolymers (in particular copolymers having a proportion of approximately 15 to approximately 35 wt. % of methyl acrylate).

In certain configurations of this embodiment, the weight ratio of the thermoplastic elastomer to the non-elastomeric thermoplastic polymer is at least 0.5:1 or at least 1:1 and/or no more than 5:1 or 2.5:1.

The tackifying resin can be selected from the group consisting of colophony, terpene resins, terpene phenolic resins, hydrocarbon resins, aromatic tackifying resins originating from cracked crude oil distillates, tall oil, ketone resins and aldehyde resins. Suitable colophony resins are in particular those consisting of abietic acid, levopimaric acid, neoabietic acid, dextropimaric acid, palustric acid, alkyl esters of the aforementioned resin acids and hydrogenated products of resin acid derivatives.

Examples of suitable plasticizers are alkyl esters of dibasic acids (e.g. phthalate esters), diaryl ethers, benzoates of polyalkylene glycols, organic phosphates and alkyl sulfonic acid esters of phenol or kresol.

A very particularly preferred subject of the invention contains, in addition to the blowing agent, in the thermally expandable compositions at least one peroxidically crosslinkable polymer as a binder system and at least one peroxide as a hardener.

In principle, all thermoplastic polymers and thermoplastic elastomers that can be peroxidically crosslinked can be used as peroxidically crosslinkable polymers. A person skilled in the art uses the expression "peroxidically crosslinkable" to refer to polymers in which a hydrogen atom can be abstracted from the main chain or a side chain upon action of a radical initiator, such that a radical is left behind that acts on other polymer chains in a second reaction step.

In a preferred embodiment, the at least one peroxidically crosslinkable polymer is selected from styrene-butadiene block copolymers, styrene-isoprene block copolymers, ethylene-vinyl acetate copolymers, functionalized ethylene-vinyl acetate copolymers, functionalized ethylene-butyl acrylate copolymers, ethylene-methyl acrylate copolymers, ethylene-ethyl acrylate copolymers, ethylene-butyl acrylate copolymers, ethylene-(meth)acrylic acid copolymers, ethylene-2-ethylhexyl acrylate copolymers, ethylene-acryl ester copolymers and polyolefins, such as polyethylene or polypropylene.

According to the invention, a "functionalized copolymer" is understood to be a copolymer which is provided with additional hydroxide groups, carboxyl groups, anhydride groups, acrylate groups and/or glycidyl methacrylate groups.

Within the meaning of the present invention, ethylene-vinyl acetate copolymers, functionalized ethylene-vinyl acetate copolymers, functionalized ethylene-butyl acrylate copolymers, ethylene-propylene-diene copolymers, styrene-butadiene block copolymers, styrene-isoprene block copolymers, ethylene-methyl acrylate copolymers, ethylene-ethyl acrylate copolymers, ethylene-butyl acrylate copolymers and ethylene-(meth)acrylic acid copolymers are particularly advantageous.

Particularly good adhesion properties can be achieved, in particular on an oiled plate, if thermally hardenable preparations according to the invention are used which contain one or more ethylene-vinyl acetate copolymers as solely peroxidically hardenable polymers, i.e. excluding the ethylene-vinyl acetate copolymers, the thermally hardenable preparations are substantially free of further peroxidically hardenable polymers.

According to the invention, thermally expandable preparations are "substantially free of further peroxidically hardenable polymers" when they contain less than 3 wt. %, preferably less than 1.5 wt. %, more particularly preferably less than 0.5 wt. %, of a peroxidically crosslinkable polymer which is not an ethylene-vinyl acetate copolymer.

Thermally expandable preparations which contain at least one ethylene-vinyl acetate copolymer having a vinyl acetate proportion of from 9 to 30 wt. %, in particular from 15 to 20 wt. %, more particularly from 17.5 to 19 wt. %, based on the total weight of the copolymer, are particularly preferred according to the invention.

Furthermore, it has been found to be advantageous for the thermally expandable preparation to contain a peroxidically crosslinkable polymer, in particular an ethylene-vinyl acetate copolymer, having a melt flow index of from 0.3 to 400 g/10 min, in particular from 0.5 to 45 g/10 min. Peroxidically crosslinkable polymers, in particular ethylene-vinyl acetate copolymers, having a melt flow index of from 1.5 to 25 g/10 min, in particular from 2 to 10 g/10 min, more particularly from 2 to 8 g/10 min are advantageous. According to the invention, it can be advantageous for two or more polymers having different melt flow indices to be used in the thermally expandable preparations.

For this purpose, the melt flow index is determined in a capillary rheometer, the polymer being melted at 190° C. in a heatable barrel and being pushed through a defined extruder die (capillary) at a pressure produced by the bearing load (2.16 kg) (ASTM D1238). What is measured is the mass of material that extrudes from the die, as a function of time.

The thermally expandable preparations preferably contain at least 30 wt. % of at least one peroxidically crosslinkable polymer. Particularly preferred are thermally expandable preparations that contain from 40 to 90 wt. %, in particular from 50 to 80 wt. %, of at least one peroxidically crosslinkable polymer, based in each case on the total weight of the thermally expandable preparation.

In addition to the peroxidically crosslinkable polymers, the thermally expandable preparations may also preferably contain, as further components, at least one low-molecular multifunctional acrylate.

A "low-molecular multifunctional acrylate" is understood to mean a compound which has at least two acrylate groups and a molar weight of below 2400 g/mol, preferably below 800 g/mol. Compounds in particular that have two, three or more acrylate groups per molecule have been found to be advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butandiol dimethacrylate, 1,3 butylene glycol dimethacrylate, 1,3-butanediol dimethacrylate, tricyclodecane dimethanol dimethacrylate, 1,10-dodecanediol dimethacrylate, 1,6-hexanediol dimethacrylate, 2-methyl-1,8-octanediol dimethacrylate, 1,9-nonanediol dimethacrylate, neopentyl glycol dimethacrylate and polybutylene glycol dimethacrylate.

Preferred low-molecular acrylates having three or more acrylate groups are glycerol triacrylate, dipentaerythritol hexaacrylate, pentaerythritol triacrylate (PETA-3), tetramethylolmethane tetraacrylate (TMMT), trimethylolpropane triacrylate (TMPTA), pentaerythritol trimethacrylate (PETMA-3), di(trimethylolpropane) tetraacrylate (TMPA), pentaerythritol tetraacrylate (PETA-4), trimethylolpropane trimethacrylate (0), tri(2-acryloxyethyl)isocyanurate and tri(2-methacryloxyethyl)trimellitate and the ethoxylated and propoxylated derivatives thereof having a content of a maximum of 35-EO units and/or a maximum of 20-PO units.

According to the invention, very particularly preferred are thermally expandable preparations that contain a low-molecular multifunctional acrylate selected from triethylene glycol diacrylate, triethylene glycol dimethacrylate, trimethylolpropane triacrylate (TMPTA) and trimethylolpropane trimethacrylate (TMPTMA), pentaerythritol triacrylate (PETA-3), tetramethylolmethane tetraacrylate (TMMT), pentaerythritol trimethacrylate, di(trimethylolpropane)tetraacrylate (TMPA) and pentaerythritol tetraacrylate (PETA-4).

In addition to the low-molecular acrylates, the thermally expandable preparations may contain further co-crosslinking agents, such as allyl compounds, for example triallyl cyanurate, triallyl isocyanurate, triallyl trimesate, triallyl trimellitate (TATM), tetraallyl pyromellitate, the diallyl esters of 1,1,3-trimethyl-5-carboxy-3-(4-carboxyphenyl)indene, trimethylolpropane trimellitate (TMPTM) or phenylene dimaleimide.

It has been found to be particularly advantageous for the thermally expandable preparations to contain at least one low-molecular multifunctional acrylate selected from triethylene glycol diacrylate, trimethylolpropane triacrylate (TMPTA) and trimethylolpropane trimethacrylate (TMPTMA).

The low-molecular multifunctional acrylates are contained in the thermally expandable preparations preferably in an amount of from 0.2 to 2.5 wt. %, in particular from 0.4 to 1.4 wt. %, based in each case on the total weight of the thermally expandable preparation.

As a hardening system for the peroxidically crosslinkable polymers, the thermally expandable preparations preferably contain at least one peroxide. In particular, organic peroxides are suitable, for example ketone peroxides, diacyl peroxides, peresters, perketals and hydrogen peroxides. Particularly preferred are for example cumene hydroperoxide, t-butyl peroxide, bis(tert-butylperoxy)-diisopropylbenzene, di(tert-butylperoxyisopropyl)benzene, dicumyl peroxide, t-butyl peroxybenzoate, dialkyl peroxydicarbonate, diperoxy ketals (e.g. 1,1-di-tert-butylperoxy-3,3,5-trimethylcyclohexane), ketone peroxides (e.g. methyl ethyl ketone peroxides) and 4,4-di-tert-butylperoxy-n-butyl-valerate.

Examples of peroxides commercially marketed by Akzo Nobel are particularly preferred, such as 3,3,5,7,7-pentamethyl-1,2,4-trioxepane, 2,5-dimethyl-2,5-di(tert-butylperoxy)hex-3-in, di-tert-butyl peroxide, 2,5-dimethyl-2,5-di(tert-butylperoxy)hexane, tert-butyl cumyl peroxide, di-(2-tert-butylperoxyisopropyl)benzene, dicumyl peroxide, butyl-4,4-di(tert-butylperoxi)valerate, tert-butylperoxy-2-ethylhexyl carbonate, 1,1-di-(tert-butylperoxy)-3,3,5-trimethylcyclohexane, tert-butyl peroxybenzoate, di-(4-methylbenzoyl)peroxide and dibenzoyl peroxide.

It has also been found to be advantageous for the peroxides used to be substantially inert at room temperature and to be activated only when heated to relatively high temperatures (for example when heated to temperatures of between 130° C. and 240° C.). It is particularly advantageous for the peroxide used to have a half-life of more than 60 minutes at 65° C., i.e. after the thermally expandable preparation containing the peroxide has been heated to 65° C. for 60 minutes, less than half of the peroxide used has decomposed. According to the invention, peroxides of this kind that have a half-life of 60 minutes at 115° C.

At least one peroxide selected from the group consisting of di(tert-butylperoxyisopropyl)benzene, dicumyl peroxide, 1,1-di-(tert-butylperoxy)-3,3,5-trimethylcyclohexane, dibenzoyl peroxide and di-tert-butyl-1,1,4,4-tetramethylbut-2-in-1,4-ylendiperoxide is particularly preferably contained.

According to the invention, it is also advantageous for at least one peroxide or the peroxides to be used when applied to a solid inert carrier, such as calcium carbonate and/or silica and/or kaolin.

Preferably, the peroxide is selected such that the crosslinking temperature T90 is below, preferably 15 to 35° C. below, the decomposition temperature of the blowing agent. This ensures a high gas yield and thus a high degree of expansion of the material. The crosslinking temperature T90 is defined as the temperature at which 90% of the crosslinking of the material is achieved within 12 minutes.

The at least one peroxide or the peroxides is/are contained in the thermally expandable preparations according to the invention preferably in an amount of from 0.2 to 2 wt. %, in particular in an amount of from 0.5 to 1.3 wt. %, the active substance content of peroxide being based in each case on the total weight of the thermally expandable preparation.

Furthermore, it is advantageous for the weight ratio of the at least one peroxide to the at least one low-molecular multifunctional acrylate to be at least 1:3. A weight ratio of at least 1:3 is always achieved according to the invention if the formulation contains at most 3 g of the low-molecular multifunctional acrylate, based on 1 g of peroxide. A weight ratio of at least 1:2.5, in particular at least 1:1.6, is particularly preferred.

By selecting this weight ratio, it is possible according to the invention for the connection, i.e. adhesion, to the opposite plate to be improved. It has been found that the thermally expandable preparations according to the invention have improved adhesion in particular in narrow regions of the system to be sealed, since the foam itself penetrates the smallest of corners and at acute angles, and therefore it is possible for the system to be sealed in a more complete manner.

As a further component, the thermally expandable composition comprises at least one catalyst. This catalyst is an element or a compound that catalyzes the release of $CO_2$. This occurs by the at least one organic carbonate according to the invention decomposing. In principle, all elements and compounds known in the prior art that catalyze the decomposition of organic carbonates are suitable for this purpose. In a preferred embodiment of the present invention, the at least one catalyst is a Lewis acid and/or a Brønsted acid. "Lewis acid" and "Brønsted acid", as used herein, refer to the generally accepted meaning of the term in each case. A Lewis acid is an electron pair acceptor that is capable of taking up electron pairs. A Brønsted acid is a compound that is capable of donating protons (H+). In this case, Brønsted acids can also fulfil the function of a Lewis acid, and vice versa. The at least one catalyst is preferably selected from the group consisting of metal complexes, metal salts, mineral acids and salts thereof, and carboxylic acids and salts thereof.

All Brønsted acids known in the prior art that are suitable for this purpose can be used as a Brønsted acid. These include organic acids, such as carboxylic acids and mineral acids. "Carboxylic acid", as used herein, refers to a compound that bears at least one carboxy group (—C(=)OH). All carboxylic acids known in the prior art that are suitable for this purpose can be used as a carboxylic acid. These include, but are not limited to, formic acid, acetic acid, propionic acid, butanoic acid, acrylic acid, oleic acid, oxalic acid, succinic acid, fumaric acid, maleic acid, benzoic acid, salicylic acid, nicotinic acid, citric acid and saccharic acids. "Mineral acid", as used herein, refers to the generally accepted meaning of this term and covers the acids HCl, $H_2SO_4$, $HNO_3$ and $H_3PO_4$, for example.

All Lewis acids known in the prior art that are suitable for this purpose can be used as a Lewis acid. These include, but are not limited to, $BF_3$, $AlCl_3$, $SiCl_4$, $PF_5$, $PPh_3$ and salts thereof.

"Metal complexes", as used herein, refers to compounds having at least one metal ion which is surrounded by at least one ligand. In this case, the ligands are either inorganic or organic and optionally have an electric charge. If the ligand has an electric charge, it forms, together with the metal ion, a "metal salt". Therefore, metal salts are a subgroup of metal complexes. Metal complexes have the formula $M_nX_m$, M being at least one metal ion, X being at least one ligand, and m and n each being a natural number. These metal ions are preferably ions of the transition metals. In principle, all metals that are known in the prior art and are suitable for this purpose can be used. These include, but are not limited to, metals of any charge, such as $K^+$, $Na^+$, $Li^+$, $Cu^+$, $Mg^{2+}$, $Ca^{2+}$, $Ba^{2+}$, $Cu^{2+}$, $Zn^{2+}$, $Al^{3+}$ and $Fe^{3+}$. In principle, all ligands that are known in the prior art and are suitable for this purpose can be used and can be used to neutralize the charge of the metal ion. These ligands include, but are not limited to, monodentate ligands and polydentate ligands, which are therefore referred to as chelating ligands, such as $F^-$, $Cl^-$, $Br^-$, $I^-$, $SO_4^{2-}$, $SO_3^{2-}$, acetylacetone (acac), ethylenediamine(s), oxalate and ethylenediaminetetraacetic acid (EDTA). The catalyst is preferably selected from the group consisting of $FeSO_4$, $Co(acac)_2$, $Cu(acac)_2$, $Cu(I)_2P$, $Cu(II)_2O$, $Cu(O)$, $Zn(acac)_2$ and mixtures thereof. A copper-containing catalyst, in particular $Cu(acac)_2$, is particularly preferably used as the catalyst.

A combination of an organic carbonate of Formula (V) and/or (VI) and a catalyst selected from the group consisting of $FeSO_4$, $Co(acac)_2$, $Zn(acac)_2$ and $Cu(acac)_2$ is particularly advantageous. A mixture of the organic carbonate of Formula (VI) and $Cu(acac)_2$ has been found to be extremely advantageous.

In addition to the above-mentioned components, the thermally expandable compounds may contain further conventional components, such as fillers, plasticizers, reactive diluents, rheology auxiliary agents, wetting agents, adhesion promoters, anti-aging agents, stabilizers and/or dye pigments.

Various ground or precipitated chalks, calcium magnesium carbonate, talc, graphite, barite, silicic acids or silica, and in particular silicate fillers, such as mica, in the form of chlorite for example, or silicate fillers of the aluminum-magnesium-calcium-silicate type, e.g. wollastonite, can be used, for example, as fillers. Talc is a particularly preferred filler. The fillers are preferably coated, preferably with stearic acid or stearates. This positively influences the flow behavior.

The fillers are preferably used in an amount of from 0 to 60 wt. %, in particular from 0 to 50 wt. %, preferably from 0.1 to 40 wt. %, particularly preferably from 1 to 30 wt. %, based in each case on the weight of the overall thermally expandable composition.

Color-imparting components, in particular black dyes based on graphite and/or carbon black, are contained in the thermally expandable compositions according to the invention preferably in an amount of from 0 to 2 wt. %, in particular from 0.1 to 0.8 wt. %, more particularly preferably from 0.15 to 0.4 wt. %, based in each case on the weight of the overall thermally expandable composition.

Sterically hindered phenols and/or sterically hindered thioethers and/or sterically hindered aromatic amines can be used, for example, as antioxidants or stabilizers, such as bis-(3,3-bis-(4'-hydroxy-3-tert-butylphenyl)butanic acid) glycol esters or 4-methylphenol, reaction products with dicyclopentadiene and isobutylene (Wingstay L).

Antioxidants or stabilizers are contained in the thermally expandable compositions according to the invention preferably in an amount of from 0 to 0.5 wt. %, in particular from 0.1 to 0.3 wt. %, based in each case on the weight of the overall thermally expandable composition.

Reactive diluents for epoxide resins are low-viscosity substances (glycidyl ethers or glycidyl esters) that contain epoxy groups and have an aliphatic or aromatic structure. These reactive diluents can be used to reduce the viscosity of the binder system above the softening point, and they can control the pregellation process in injection molding. Typical examples of suitable reactive diluents are mono-, di- or triglycidyl ethers of C6 to C14 monoalcohols or alkylphenols and the monoglycidyl ethers of cashew shell oil, diglycidyl ethers of ethylene glycol, diethylene glycol, triethylene glycol, tetraethylene glycol, propylene glycol, dipropylene glycol, tripropylene glycol, tetrapropylene glycol, 1,4-butylene glycol, 1,5-pentanediol, 1,6-hexanediol, cyclohexanedimethanol, triglycidylethers of trimethylolpropane and glycidyl esters of C6 to C24 carboxylic acids or mixtures thereof.

The thermally expandable compositions according to the invention are preferably formulated such that they are solid at 22° C. According to the invention, a thermally expandable composition is referred to as being "solid" when the geometry of said composition is not deformed under the influence of gravity at the specified temperature within a period of 1 hour, in particular 24 hours.

The thermally expandable compositions according to the invention can be prepared by mixing the selected components in any suitable mixer, for example a kneader, a double Z kneader, a closed mixer, a twin-screw mixer, a continuous mixer or an extruder, in particular a twin-screw extruder.

Although it can be advantageous to heat the components slightly to facilitate achieving a homogeneous and uniform compound, care must be taken to ensure that temperatures which cause the hardener, accelerator and/or blowing agent to be activated are not reached. The resulting thermally expandable composition can be shaped immediately after it has been prepared, for example by blow molding, pelletization, injection molding, compression molding, punching or extrusion.

The thermally expandable composition expands by being heated, the composition being heated for a particular time period and to a particular temperature which is sufficient for activating the blowing agent. The expansion results in $CO_2$ being released from the cyclic carbonates. Depending on the composition of the composition and the requirements of the production line, these temperatures are usually in a range of from 110 to 240° C., preferably from 120 to 210° C., with a residence time of from 10 to 90 minutes, preferably from 5 to 60 minutes.

In the field of vehicle construction, it is particularly advantageous for the compositions according to the invention to expand when the vehicle passes through the furnace for curing the cathodic dip paint, and therefore a separate heating step can be dispensed with.

The thermally expandable compositions of the present invention can be used in a wide range of support, filling, sealing and adhesive applications, for example in the field of baffle parts for sealing cavities in vehicles or as structure-stiffening shaped parts. However, use as lining adhesives, for example in doors or roofs, is also conceivable. For an intended purpose of this kind, the thermally expandable compositions according to the invention can be applied by means of direct extrusion. The compositions can, however, also be applied to the application site in an extruded form and pressed and/or fused onto said site by heating the steel. As a third alternative, it is also conceivable for the compositions to be applied as a co-extrudate. In this embodiment, according to the invention, a second adhesive composition is applied in a thin layer under the actual non-adhesive shaped part consisting of the thermally expandable composition according to the invention. In the context of this embodiment, said second adhesive layer is used to secure the shaped part in the shell.

The thermally expandable compositions are thus particularly suitable for producing shaped bodies, in particular baffle parts for sealing cavities and/or structure-stiffening shaped parts, i.e. for producing parts which are inserted in the cavities in vehicles, subsequently expanded by being heated and simultaneously cured, so as to thereby seal and/or strengthen the cavities as completely as possible.

In a further aspect, the present invention accordingly relates to a shaped body which comprises a thermally expandable composition according to the invention. This may be, for example, a baffle part which is intended for sealing cavities in a component and has a shape that is adapted to the cavity, or a structure-strengthening part.

According to the invention, "a shape that is adapted to the cavity" is understood to mean all baffle part geometries which ensure that the cavity is completely sealed after the expansion. The shape of the baffle part may be individually adapted to the shape of the cavity and have suitable pointed and/or rounded portions; however, in the case of the thermally expandable compositions according to the invention that have high degrees of expansion, the introduction of a suitably large amount in a variable shape, for example in the shape of a bead or a cut-to-length strand of the material, into the cavity may also be sufficient to ensure that the cavity is completely sealed after expansion.

Baffle parts of this kind are usually produced from the thermally expandable compositions according to the invention by means of injection molding. In the process, the thermally expandable compositions are heated to temperatures in the range of from 70 to 120° C. and then injected into a correspondingly formed mold.

The shaped bodies according to the invention can be used in all objects that have cavities. These objects include, in addition to vehicles, aircraft, rail vehicles, domestic appliances, furniture, buildings, walls, partitions or boats.

A further subject of the present invention is a method for sealing and filling cavities in components, for strengthening or stiffening components, in particular hollow components, and for bonding movable components, using the compositions and shaped bodies described herein. The method is preferably a method for sealing cavities in a component, a baffle part according to the invention being introduced into the cavity and then heated to a temperature of above 30° C., preferably of 50° C. and 250° C., particularly preferably of 80° C. and 160° C., such that the thermally expandable composition expands and seals, fills or strengthens the cavity.

A further subject of the present invention is the use of a shaped body or baffle part according to the invention for acoustically sealing cavities in components and/or for sealing cavities in components from water and/or moisture.

Yet another subject of the present invention is the use of a shaped body according to the invention for strengthening or stiffening components, in particular hollow components.

Another subject of the present invention is the use of at least one organic carbonate of Formula (I)-(VI) in a thermally expandable composition as a chemical blowing agent.

The following examples are intended to explain the invention in more detail, it not being intended for the choice of examples to have a limiting effect on the scope of the subject matter of the invention. Unless specified otherwise, the specified amounts in the compositions are in parts by weight.

PRACTICAL EXAMPLES

Example 1: Synthesis of Organic Carbonates from Epoxides and Carbon Dioxide

Tetrabutylammonium bromide, chloride and iodide were obtained from Acros. The epoxides D.E.R. 331 and D.E.R. 749 were obtained from Dow Chemicals. Celloxide 2021P was obtained from Daicel, and Prepo 2000LV was obtained from Henkel AG & Co. KGaA.

The carbonates were prepared using a two-part 1-liter glass reactor equipped with a hollow mechanical stirrer and a thermometer. The temperature was kept constant by connecting the thermometer to a hot plate. Dry ice ($CO_2$) was supplied to another 1-liter balloon. The released gas was introduced into the main reactor through a polyethylene tube by means of the hollow stirrer. The epoxide was supplied to the reactor, together with the corresponding catalyst (10 wt. % of the epoxide), and heated at 140° C. while being continuously stirred. Bubbles could be observed in the epoxide mixture.

Dry ice was added to the 1-liter balloon every 4 to 5 hours. After 2 to 3 days, the mixture was white and highly viscous. At this stage, the reaction mixture was cooled.

TABLE 1

Synthesis of carbonates using tetrabutylammonium halogen salts as catalysts

| | Yield after 1 day* | Yield after 2 days* | Yield after 3 days* |
|---|---|---|---|
| Tetrabutylammonium bromide | 77.8% | ~99% | 100% |
| Tetrabutylammonium chloride | 94.0% | 94% | 94% |
| Tetrabutylammonium iodide | 69.2% | 90.9% | 100% |

Epoxide: D.E.R. 331: 2,2-bis-[4-(2,3-epoxypropoxy)phenyl]propane/no solvent/*yield calculated from $^1$H NMR measurement.

TABLE 2

Epoxide resins used as starting materials for the synthesis of organic carbonates

| Epoxide | Molecule structure | Form | EEW* | EGC** |
|---|---|---|---|---|
| D.E.R. 331 | product of epichlorohydrin with bisphenol A | liquid | 182-192 | 5,200-5,500 |
| Prepo 2000LV | prepolymer | liquid | | |
| D.E.R. 749 | product of epichlorohydrin and tetramethylolmethane (pentaerythritol) | liquid | | |
| Celloxide 2021P | double heterocycle | liquid | 128-145 | |

*EEW: epoxide equivalent weight (g/eq);
**EGC: epoxide group content (mmol/kg)

The synthesis of an organic carbonate of Formula (VII) starting from D.E.R. 749 and using tetrabutylammonium chloride as the synthesis catalyst and the decomposition mechanism using $Cu(acac)_2$ as the decomposition catalyst are shown in the following diagram.

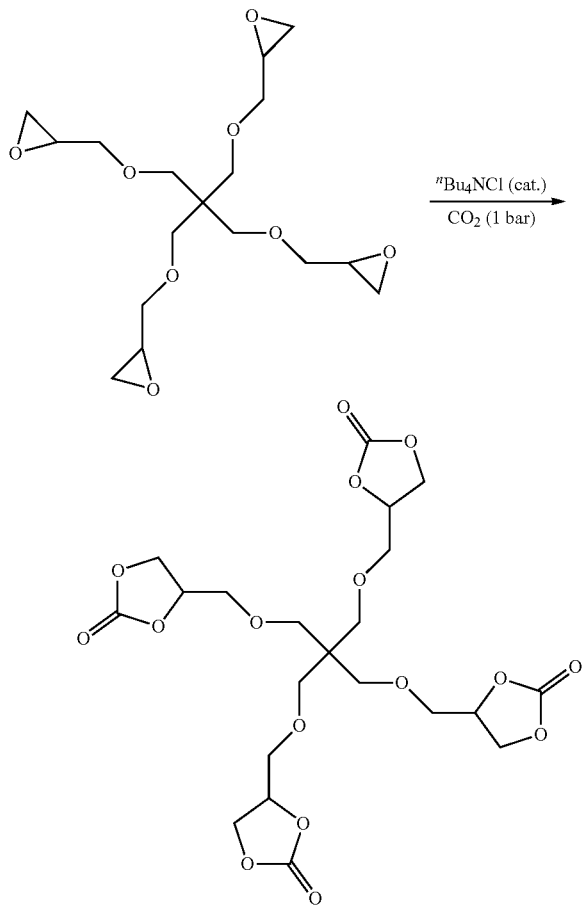

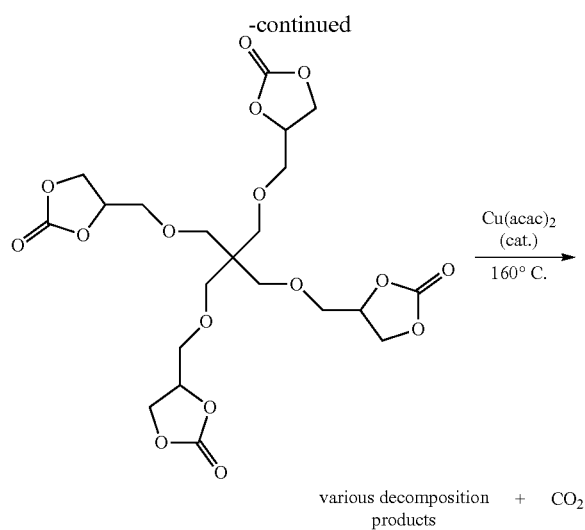

Example 2: Epoxide-Based, Thermo-Hardening Adhesives Containing the Blowing Accent According to the Invention First Recipe Kane Ace MX-125 (bisphenol-A-diglycidyl ether+25% core shell particle (styrene-butadiene copolymer)) was obtained from Kaneka, and Cab-o-Sil TS 720 and Monarch 580 were obtained from Cabot. Super 40 was obtained from Ulmer Weisskalk. 3M glass bubble VS5500 was obtained from 3M. Kevlar 1F1464 was obtained from DuPont. Omyacarb 4HD was obtained from Omya. Dyhard UR700 (3-phenyl-1,1-dimethylurea) and Dyhard 100SH (dicyandiamide) were obtained from Alz chem.

TABLE 3

First recipe

| | Compound | wt. % |
|---|---|---|
| 1 | D.E.R. 331 | 11.78%* |
| 1 | Kane Ace MX-125 | 23.56%* |
| 1 | Prepo 2000LV | 15.26%* |
| 2 | Cab-o-Sil TS 720 | 1.88%* |
| 3 | Super 40 | 3.77%* |
| 3 | 3M glass bubble VS5500 | 13.95%* |
| 4 | Kevlar 1F1464 | 1.88%* |
| 4 | Omyacarb 4HD | 16.58%* |
| 5 | Monarch 580 | 0.19%* |
| 5 | Dyhard UR700 | 0.19%* |
| 5 | Dyhard 100SH | 3.96%* |
| 6 | carbonate | 7.00%* |
| 6 | catalyst | ** |

*% of the total weight/
** this parameter is variable

The formulation was obtained by step-by-step mixing of the components, as specified by the numbering in table 3. D.E.R. 331, Kane Ace MX-125 and Prepo 2000LV were filled into a container, which was adapted to the desired amounts. Mixing was carried out using a mechanical stirrer (MOLTENI/LABMAX P2 3/1—2001 type coupled to a DIAPHRAGM VACUUM PUMP/MD 4C 3.0 m$^3$/h). The mixture was mixed in vacuo for 15 minutes. Cab-o-Sil TS 720 was added and slowly mixed at atmospheric pressure, and this was followed by further mixing in vacuo. After 15 minutes, Super 40 and 3M glass bubble VS5500 were added using the same procedure as for Cab-o-Sil TS 700. For steps 4, 5 and 6, the compounds were added to the mixture and mixed therein in vacuo for 15 minutes in each case.

The weight proportion of the catalyst was varied depending on the carbonate (molecular weight) and the expected reaction speed. The obtained mixture was a black, fibrous formulation.

Second Recipe

The recipe was prepared in a step-by-step fashion according to table 4. A polypropylene container was loaded with the first compounds. The mixture was mixed for 1 minute at 0.2 kpa and 2000 r/min using a mixer of the THINKY PLANETARY vacuum mixer Aro 310 type. For the subsequent steps, the same procedure was selected. The obtained mixture is a red, paste-like formulation. Graphtol Rot LG was obtained from Clariant.

TABLE 4

Second test recipe having a lower viscosity and not having fiber fillers

| | Compound | wt. % |
|---|---|---|
| 1 | D.E.R. 331 | 16.56%* |
| 1 | Kane Ace MX-125 | 33.20%* |
| 1 | Prepo 2000LV | 21.52%* |
| 2 | Cab-o-Sil TS 720 | 2.64%* |
| 5 | Graphtol ROT LG | 0.24%* |
| 5 | Dyhard UR700 | 0.24%* |
| 5 | Dyhard 100SH | 5.60%* |
| 6 | carbonate | 20.00%* |
| 6 | catalyst | ** |

*% of the total weight/
** this parameter is variable

In order to analyze the organic carbonates obtained in example 1, samples of the above-mentioned recipes that contained the corresponding carbonates (see table 5) were thermo-hardened and the expansion was determined from the change in density. In addition, the conversion rate was tested as a function of the loss in mass resulting from the decomposition of the carbonate. The density of the completely hardened reference formulation without any blowing agents was determined as being 1.06 g/cm$^3$.

TABLE 5

Formulations comprising carbonates

| Carbonate synthesized by | Loss in mass | Density after hardening |
|---|---|---|
| D.E.R. 331 carbonate | 4.4% | 0.72 |
| Prepo 2000LV carbonate | 5.0% | 0.95 |
| D.E.R. 749 carbonate | 1.9% | 0.67 |
| Celloxide 2021P carbonate | 4.0% | 0.84 |

Conditions: 5 mol. % Cu(acac)$_2$/hardening at 180° C. for 20 minutes

The formulations that have the lowest density after hardening are those that have the best expansion rates. Carbonates prepared from D.E.R. 331 and D.E.R. 749 were the carbonates that resulted in the best expansion for the first recipe. It is also clear from the results that expansion alone is not a good indicator of an effective blowing agent, since some of the formed CO$_2$ can be lost owing to viscosities that are too low. This indicates the importance of fine tuning the blowing agent in relation to the expected hardening window, and this can be achieved for the organic carbonates simply by selecting different catalysts or different catalyst amounts.

Example 3: Organic Carbonates as Blowing Agents for Crosslinkable Polyethylene Vinyl Acetate (EVA)

Recipe Comprising EVA

The two polymers Alcudia EVA PA 538 and Elvaloy 4170 were obtained from Repsol and DuPont, respectively. The peroxide Peroxan HX 45P was obtained from Pergan.

TABLE 6

EVA formulation

|   | Compound | wt. % |
|---|----------|-------|
| 1 | Alcudia EVA PA 538 | 69%* |
| 1 | Elvaloy 4170 | 10%* |
| 2 | carbonate | 20%* |
| 2 | catalyst | ** |
| 3 | Peroxan HX 45P | 1%* |

*% of the total weight/
** this parameter is variable

The two EVA polymers were mixed in a kneader at 100° C. for 20 minutes. Once the mixture was homogeneous, the mixture was cooled to 90° C. and the carbonate was slowly added. It took between 10 and 120 minutes for the carbonate to be added (depending on the viscosity of the carbonate). Once all of the carbonate had been added, the mixture was mixed until it was homogeneous. The catalyst was then added and mixed therein for 15 minutes at 90° C. The mixture was then cooled and Peroxan HX 45P was added and mixed for 5 minutes at 80° C. The mixture obtained is typically white (if the catalyst is colorless).

This mixture was then pressed at 80° C. with a force of 5 kN for 15 minutes and then for a further 15 minutes at 15° C. Plates having a thickness of 6 mm were obtained.

Some catalysts were tested by means of DSC and those that resulted in the best expansion in epoxide formulations were tested further in the EVA recipe comprising the D.E.R. 331 carbonate.

Iron(II)sulfate heptahydrate was obtained from the applicant. Cobalt(II) acetylacetonate, copper(II) acetylacetonate and zinc(II) acetylacetonate hydrate was obtained from Sigma-Aldrich.

TABLE 7

Expansion formulation comprising a carbonate and catalyst

| Catalyst | Loss in mass | Density before | Density after | Volume expansion |
|---|---|---|---|---|
| iron(II)sulfate heptahydrate (FeSO$_4$ × 7H$_2$O) | −0.87%, | 0.9923 | 0.7809 | +139.63% |
| cobalt(II)acetylacetonate (Co(acac)$_2$) | −1.82%, | 0.987 | 0.5032 | +197.49% |
| copper(II)acetylacetonate (Cu(acac)$_2$) | −3.48%, | 0.996 | 0.2423 | +420.58% |
| zinc(II)acetylacetonate hydrate (Zn(acac)$_2$ × H$_2$O) | −3.00%, | 0.9478 | 0.4274 | +244.82% |

Blowing agent: carbonate synthesized from D.E.R. 331, together with 5 mol. % of catalyst
Hardening at 180° C. for 20 minutes Copper(II)acetylacetonate (Cu(acac)$_2$) was the catalyst that resulted in the greatest volume increase for the carbonate from D.E.R. 331, with 420% expansion at 180° C.

The invention claimed is:

1. A thermally expandable composition containing: 1 (1) at least one organic compound comprising at least one cyclic carbonate group as a chemical blowing agent, (2) at least one catalyst for the blowing agent, (3) at least one reactive binder, and (4) at least one hardener and/or accelerator.

2. The thermally expandable composition according to claim 1, wherein the at least one organic compound comprising at least one cyclic carbonate group as a chemical blowing agent comprises a polyether and/or polyester, and wherein at least two, cyclic carbonate groups are bound to the polyether and/or polyester.

3. The thermally expandable composition according to claim 1, wherein the at least one organic compound used as a chemical blowing agent is a cyclic organic carbonate of Formula (I)

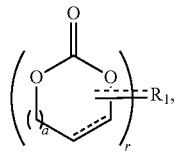

(I)

wherein

~~~~~~ is a single bond or a double bond, where if the ring contains a double bond, R$_1$ is not bound by an exocyclic double bond, but rather by a single bond; and R$_1$ is a linear or branched, substituted or unsubstituted alkyl, a linear or branched, substituted or unsubstituted heteroalkyl, a linear or branched, substituted or unsubstituted alkenyl, a linear or branched, substituted or unsubstituted alkynyl, a substituted or unsubstituted cycloalkyl, a substituted or unsubstituted aryl, or —C(O)—R$^a$, where R$^a$ is a linear or branched, substituted or unsubstituted alkyl, a linear or branched, substituted or unsubstituted heteroalkyl, a linear or branched, substituted or unsubstituted alkenyl, a linear or branched, substituted or unsubstituted alkynyl, a substituted or unsubstituted cycloalkyl, or a substituted or unsubstituted aryl;

a is an integer from 0 to 5; and r is a natural number from 1 to 10.

4. The thermally expandable composition according to claim 3, wherein the at least one organic compound used as a blowing agent is a cyclic organic carbonate of Formula (II)

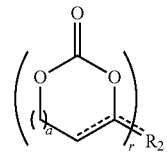

(II)

wherein

~~~~~~, a and r are as defined above and R$_2$ is defined in the same way as R$_1$.

5. The thermally expandable composition according to claim 1, wherein the at least one organic compound used as a blowing agent is a cyclic organic carbonate of Formula (III) or (IV)

(III)

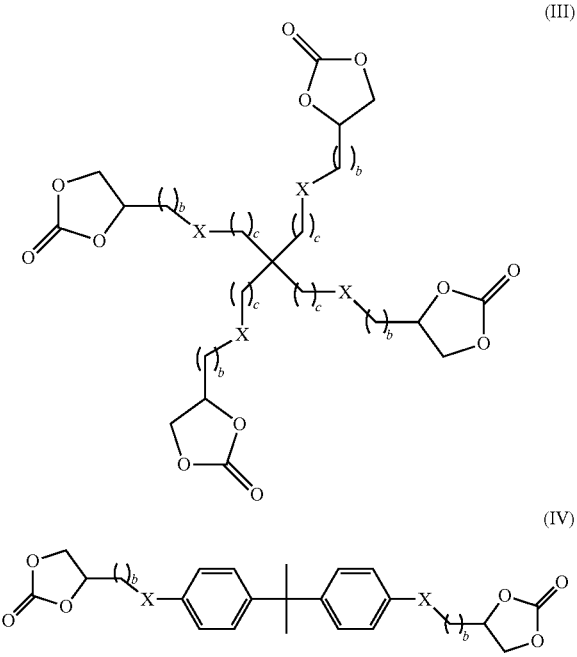

(IV)

wherein
each b and each c are, independently of one another, a natural number from 1 to 5; and
each X is selected independently from the group consisting of O, S and N.

6. The thermally expandable composition according to claim 1, wherein the at least one organic compound used as a blowing agent is a cyclic organic carbonate of Formula (V) or (VI)

(V)

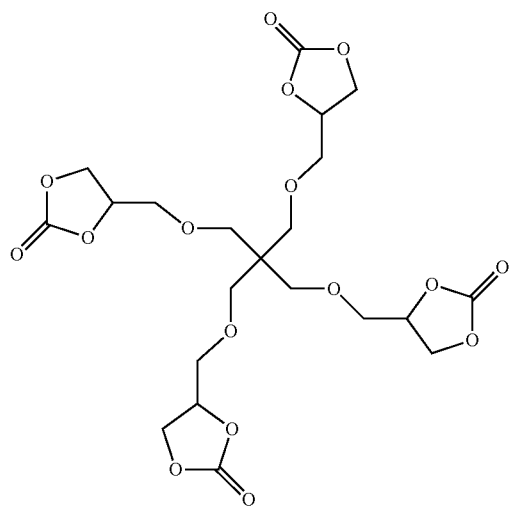

(VI)

7. The thermally expandable composition according to claim 1, wherein the reactive binder is selected from the group consisting of epoxides, rubbers, peroxidically cross-linkable polymers and combinations thereof.

8. The thermally expandable composition according to claim 1, wherein the at least one catalyst is selected from the group consisting of Lewis acids, Brønsted acids and mixtures thereof.

9. The thermally expandable composition according to claim 8, wherein the at least one catalyst is selected from the group consisting of mineral acids and salts thereof, carboxylic acids and salts thereof, metal complexes, metal salts and mixtures thereof.

10. The thermally expandable composition according to claim 1, wherein the thermally expandable composition comprises from 0.1 to 40 wt. % of the at least one organic carbonate, based on total weight of the thermally expandable composition.

11. A shaped body comprising the thermally expandable composition according to claim 1.

12. A method for sealing and filling cavities in components, for strengthening or stiffening components, optionally hollow components, and for bonding movable components, comprising: applying the thermally expandable composition according to claim 1 to a component, optionally in a cavity of the component, or between movable components; and heating to expand and cure said composition such that the thermally expandable composition seals, fills, strengthens or stiffens the component or bonds the movable components.

13. The method according to claim 12 for sealing and filling cavities in components and for strengthening or stiffening components, wherein a shaped body comprising the thermally expandable composition is inserted into a component, and is then heated to a temperature of above 30° C., such that the thermally expandable composition expands, and seals, fills, strengthens or stiffens the component.

14. A method for acoustically sealing cavities in components and/or for sealing cavities in components from water and/or moisture, or for strengthening or stiffening hollow components, comprising inserting the shaped body according to claim 11 into a cavity in the components or into the hollow components; and expanding and curing by heating the thermally expandable composition of the shaped body.

15. The method according to claim 12, comprising foaming the thermally expandable composition by heating in the presence of the at least one organic compound comprising at least one cyclic carbonate group as a chemical blowing agent in the thermally expandable composition wherein the thermally expandable composition comprises from 0.1 to 40 wt. % of the at least one organic carbonate, based on total weight of the thermally expandable composition.

* * * * *